April 10, 1934.    V. A. SCHOENBERG    1,954,329
PHOTO-ELECTRIC CELL OUTPUT CONTROL
Filed Oct. 30, 1933
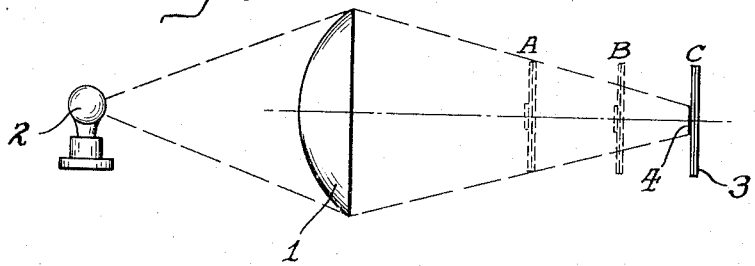
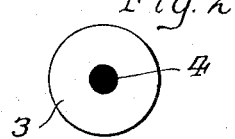
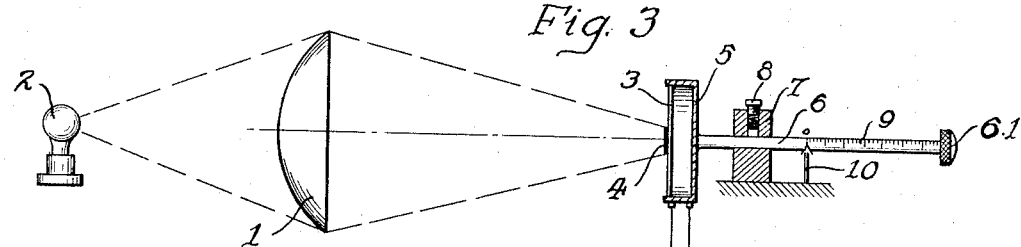
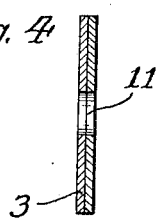
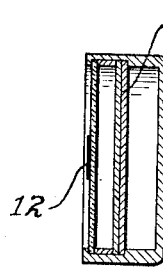
Witnesses:
Adolph T. Berg
Chas. W. Rummler
Inventor
Virgil A. Schoenberg
by Rummler, Rummler, & Woodworth
his Attys.

Patented Apr. 10, 1934

1,954,329

UNITED STATES PATENT OFFICE 1,954,329

PHOTO-ELECTRIC CELL OUTPUT CONTROL

Virgil A. Schoenberg, Niles Center, Ill.

Application October 30, 1933, Serial No. 695,869

2 Claims. (Cl. 250—41.5)

This invention relates to methods and means for controlling the energy output of photoelectric cells and particularly to methods and means for accurately controlling photoelectric cell output, from maximum to zero, mechanically and optically.

In many important uses and applications of photoelectric devices the control of energy output is a primary factor affecting the results desired or required, and many different ways of controlling such devices have been attempted and adopted. It has been found, however, that accurate control of the output of photoelectric devices is often difficult to attain and that when such results are accomplished it is usually through methods and means which in themselves are inductive to errors and inaccuracy. As a result the advantages that might derive from photoelectric devices have only partially been realized and appreciated.

The main objects of this invention are to provide an improved method for adjusting and controlling the output of photoelectric devices; to provide an improved and simplified method of accurately controlling the output of such devices; to provide an improved method of mechanically or optically controlling the output of such devices; to provide an improved photoelectric device that is more susceptible to accurate control; to provide an improved and simplified means for controlling the output of photoelectric devices; and to provide such a means arranged for accurate calibration and adjustment.

A specific embodiment of this invention is shown in the accompanying drawing in which:

Figure 1 is a diagrammatic view showing the method of controlling the output of a photoelectric device through adjustment of the same in a convergent beam of light.

Fig. 2 is a face view of a light sensitive element such as illustrated in Fig. 1, having a non-responsive central portion.

Fig. 3 is a diagrammatic sketch of an adjustable calibrated means for controlling the output of a photoelectric cell, the diagram including connections between the cell and a relay for controlling an independent electrical circuit.

Fig. 4 is a sectional view of a light sensitive element having its central portion cut away to render that portion of the element non-responsive.

Fig. 5 is a sectional view showing a light sensitive element positioned behind a glass cover having an opaque portion arranged to screen the central portion of the element to render the same non-responsive.

Essentially this invention comprises the method of controlling the output of photoelectric devices by directing a beam of light of substantially constant intensity upon a light sensitive element, a portion of which has been blinded, cut away or otherwise rendered non-responsive, and then by mechanical adjustment varying the area of the light sensitive element affected by the light beam. It will be readily understood that this might be accomplished in a number of ways. However, for illustrative purposes only one of the most simple of the various methods and arrangements is herein shown and described.

In the form shown in the drawing the apparatus and arrangement for controlling the output of a photoelectric device according to this invention comprises a fixed lens 1 arranged to receive a beam of light from a light source 2 and direct the same convergently toward a light sensitive element 3 of a photoelectric device or cell, the light sensitive element 3 having its central portion 4 positioned on the axis of the light beam and rendered non-responsive to said light beam.

With reference to Fig. 3, the light sensitive device 3 is shown mounted in a holder 5 fixed on one end of an adjustable rod 6 mounted in a support and guide 7, the rod 6 having a manipulating knob 6.1 at its other end, and its surface calibrated as at 9 to indicate various positions of adjustment or relative values of energy output from the photoelectric device. The guide and support 7 is provided with a means 8 for maintaining a frictional resistance against movement of the rod 6 in order that the same will stay in any position to which it might be adjusted. A fixed guide or pointer 10 is arranged to coact with the calibrations 9 of the rod 6 to facilitate reading the same. With this arrangement the light sensitive element 3 can be readily and accurately adjusted along the axis of a light beam in order to control the energy output of the device as will be hereafter explained.

As shown in the drawing, the light sensitive element 3 is positioned in a convergent beam of light with its non-responsive portion 4 concentric with the axis of the beam. With this arrangement and in order to obtain an output from the cell ranging from zero to its maximum, the area of the non-responsive surface 4 should be equal to or larger than the concentration of the light beam, or focal area, at the focal point of the lens 1, the diameter of the blind or non-responsive area being governed by the focal area of the light directing system employed.

In this disclosure the light sensitive element is illustrated as a circular dry plate photoelectric cell, and it is readily understood that the light sensitive element might be of any suitable form or type and that there are several ways in which a portion of the element can be rendered non-responsive. As shown in Figs. 1, 2 and 3, this is accomplished by affixing an opaque plate or screen against the face of the light sensitive element. However, the same results might be accomplished by cutting out the center portion of the light sensitive element 3 as shown at 11 in Fig. 4, or by placing an opaque object or screen in front of the element 3 as shown at 12 in Fig. 5, whereby a shadow from the opaque object is cast upon the center portion of the element 3 to render that area ineffective or non-responsive. Other methods of accomplishing the same results would include constructing a photoelectric cell having an element composed of both light sensitive and non-light sensitive zones.

In operation, the output of the photoelectric device is controlled simply by adjusting the same axially along the convergent beam of light, thus varying the area of the light sensitive surface affected by the light. Referring to Fig. 1, a light sensitive element positioned at C, which is approximately the focal point of the lens 1, and having a non-responsive area 4 equal to the focal area or area of the concentration of the light beam at that point, would produce no energy output, since no portion of the light beam would fall upon the sensitive or responsive portion of the element. When positioned at A, the element or cell would produce its maximum output since all of the light sensitive area would then be within the beam and responsive to the light falling thereupon, and when positioned at B the cell would produce approximately one-third of its maximum energy output since the energy output is substantially in proportion to the affected area of the light sensitive element of the cell.

An example of a practical application of the above described action is illustrated in Fig. 3, wherein the photoelectric cell or device is shown connected to a relay 13 which in turn is arranged to operate a secondary relay 14 for opening and closing an electric circuit from a source of current 15. The relay 13 may be of any standard construction such as the Weston No. 534, designed to operate on the microampere output of a photoelectric cell. A microammeter 16 is connected in series with the relay 13 in order to provide a means of measuring the electrical output of the photoelectric cell, and a small bridge or switch 17 is provided, by means of which the ammeter 16 can be connected directly across the cell.

As above mentioned, the cell or light sensitive element 3, when positioned at C, will produce no current, and the microammeter 16 will register zero. Therefore to produce a certain energy output from the cell, the same must be moved axially along the light beam a definite distance toward the position A, thus bringing the responsive or effective area of the element into the beam until a definite area is affected thereby. The circuit illustrated in Fig. 3 is arranged to be operated by a change of the intensity of the light beam falling upon the photoelectric cell. Therefore if it is desired that the relay 12 be operative within a predetermined range of light intensity variation, the apparatus would be adjusted in the following manner:

First the microammeter 16 would be connected across the cell by closing the switch 17 and then the cell's position would be adjusted forwardly, by means of the knob 6.1, into the convergent beam of light until a position such as B has been reached. It will now be observed that the emission or output of the cell has increased in a definite ratio with the amount that it has been adjusted forwardly into the light beam. Assuming, for instance, that it is desired that the relay 13 operate to control a current from the source 15 when the intensity of the light beam between the lens 1 and the light source 2 has been reduced 20 percent, the cell is adjusted into the light beam until a certain output is indicated on the microammeter 16 as, for example, 100 microamperes with the cell at position B. This position of the cell in the light beam is then recorded, that is either the meter reading or the position of the pointer 10 on the scale 9.

Since it is desired that the relay should operate when the intensity of the light falling upon the cell has been reduced 20 percent, the cell is next adjusted from position B toward position C, decreasing the area of the element 3 affected, until a reading of 80 microamperes is had on the meter 16, thus indicating that the cell emission or output has been reduced 20 percent from the recorded 100 microampere output. Contact 18 on the low side of the relay 13 is then adjusted until contact is made with the contactor 19, thus closing the circuit 20. The secondary relay 14 will then function, and the circuit from the current source 15 will be closed. The cell position is now adjusted back to the recorded position B, or 100 microamperes output, at which point the contactor 19 will move toward the high side of the relay, allowing the secondary relay 14 to open the circuit from the current source 15. The relay will now function each time that the light beam between the lens 1 and the light source 2, and therefore the output of the cell, has been reduced 20 percent or more as would be caused by smoke, turbidity or any other means.

No other adjustment of the relay is necessary to change the light intensity range within which it is desired to be operated. Should it be desired to operate the relay 13 at a percentage less than the assumed 20 percent, for example 10 percent, the cell is moved from position B toward position C, and to operate the relay at a value greater than 20 percent, for example 40 percent, the cell is shifted forward from position B toward position A. With the adjusting rod 6 calibrated in the various percentages or other values as desired, the exact position of the cell, relative to the lens, can be readily determined for any desired range of operation.

The explanation for this operation lies in the fact that when the cell is moved from the position B toward the position C the cell output is reduced, but the relay 12 will still operate to close the circuit 20 at the previous set value which was 80 microamperes. Thus if the position of the cell is shifted so that its output is reduced from 100 microamperes to, for example, 90, the percentage of change of intensity of the light beam required to operate the relay 13 would be 11.1 percent, since this is the difference in percentage between the values of 80 and 90 microamperes. In the same way, should it be desired to operate the relay at a 40 percent change of light intensity, the cell would be adjusted from position B toward position A until a reading is had on the microammeter 16 which, when reduced 40 percent, will equal 80 microamperes, that is 133 microamperes; i. e.

$$\frac{53}{133} = .40,$$

and $133 - 53 = 80$.

Another application of this invention is in sound level control in sound or film production. In such a case this invention is employed in the place of the usual H or T pads, which have the disadvantage of filtering out certain frequencies which it is desirable to retain, and the photoelectric device is connected directly to the amplifiers. Sound level control is then had by merely adjusting the device to vary the area of the light sensitive element affected by the actuating light beam.

It has been found by extensive research and experiments that the system herein described offers the simplest, most flexible and accurate means for the control of photoelectric cell output when the light source is of a constant or nearly constant intensity and placed at any distance from the photoelectric cell. It has also been found that with a convergent beam of light and without the blind spot or non-responsive portion of the cell located at the intersection of the axis of the light beam and the light sensitive surface, it is impractical and substantially impossible to obtain control of the cell output by mere adjustment of the cell along the axis of the light beam since the light rays become concentrated at the focal point of the convergent beam and the product of the degree of light intensity on the cell and the area of the cell affected would be substantially constant regardless of the location of the cell on the beam axis.

It is understood that the method and arrangements for practicing this invention have been disclosed herein in their simplest forms, and it is obvious to those well versed in the art that many methods and arrangements of apparatus or other applications of the invention are possible. For example, in the case of a convergent actuating beam of light, substantially the same results as herein described can be obtained by adjusting the cell in the divergent portion of the beam beyond the focal point thereof, since as the cell is moved outwardly away from the focal point of the beam the area of the light sensitive surface affected is increased in the same way as when the cell is moved inwardly toward the source of the convergent beam. Also, the actuating beam might be direct or reflected, and mirrors might be employed instead of a lens as shown.

I claim:

1. The method of controlling the output of a photoelectric cell which consists in directing a beam of light of substantially constant intensity upon the light sensitive surface of the cell, maintaining a non-responsive area at the intersection of the axis of the light beam and the light sensitive surface, and varying the area of the light sensitive surface affected by said beam of light.

2. A photoelectric device comprising a lens arranged to form a convergent beam of light, a photoelectric cell positioned on the axis of said lens and the beam of light, means to prevent light from affecting said photoelectric cell at the intersection of the lens axis therewith, and means to adjust the relationship of said cell and said lens along the axis of said lens.

VIRGIL A. SCHOENBERG.